June 29, 1954  F. H. GOOSMANN  2,682,107
CULINARY TOOL OR IMPLEMENT
Filed May 11, 1951
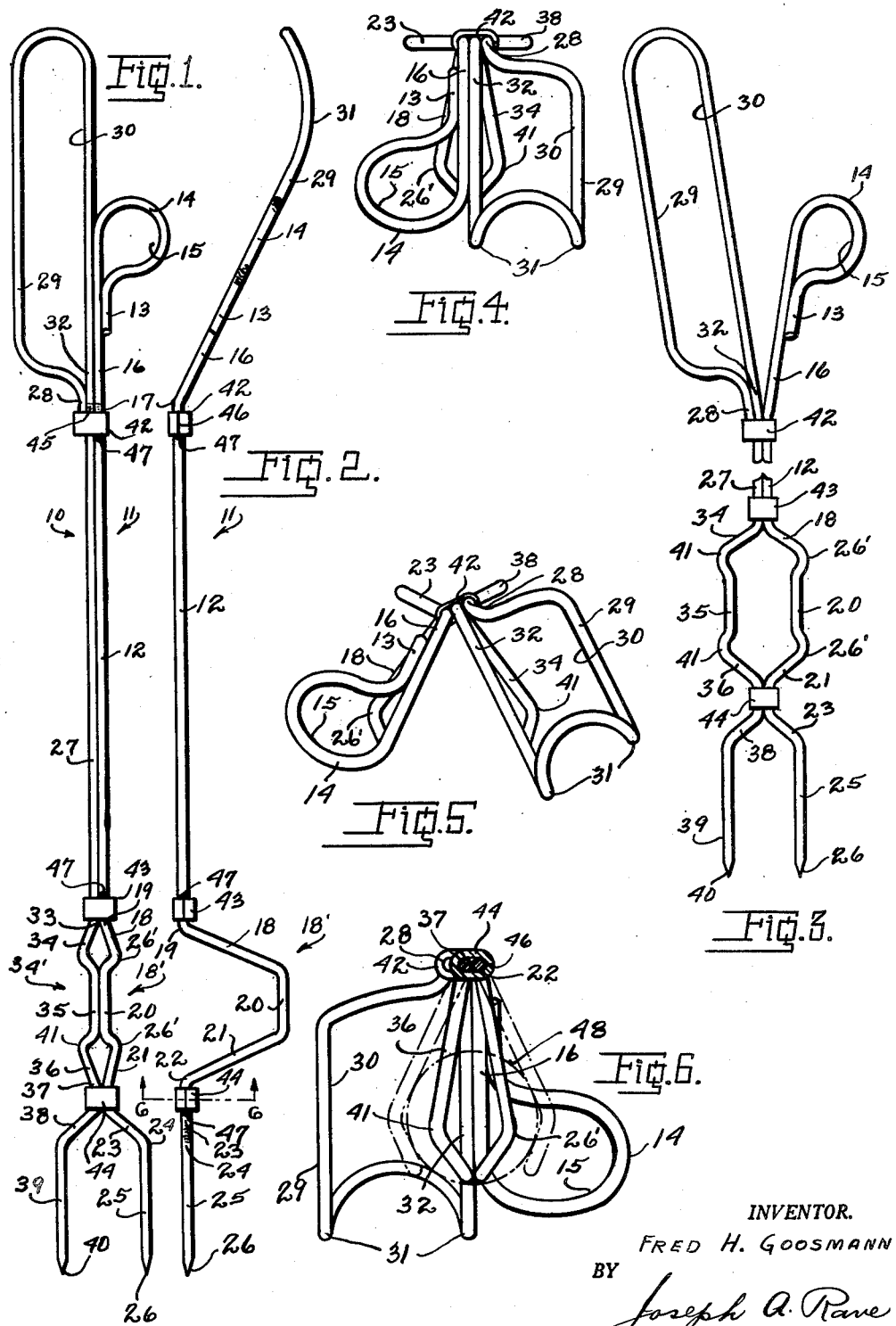
INVENTOR.
FRED H. GOOSMANN
BY
Joseph A. Rave
Attorney Patented June 29, 1954

2,682,107

UNITED STATES PATENT OFFICE 2,682,107

CULINARY TOOL OR IMPLEMENT

Fred H. Goosmann, Hamilton, Ohio

Application May 11, 1951, Serial No. 225,750

6 Claims. (Cl. 30—123)

This invention relates to improvements in a culinary tool or implement, specifically such a tool or implement as may be used at "outdoor fireplaces" or so called "bar-b-cue pits."

Specifically, the culinary tool or implement of the present invention may be designated as a combined fork and tongs, which, as indicated above, will find a principal and particular use at outdoor fireplaces or cooking pits. It is to be understood, however, that the implement may be used "indoors" at the stove or other cooking fireplace. As will be readily seen from the drawings the fork and tong portions are operated and controlled from a common handle and as will be more fully appreciated from the specification.

The principal object of the present invention is the provision of a culinary tool or implement that may be used either as a fork or as a tong and wherein the fork tines may be brought closer to one another.

Another object of this invention is the provision of a device for accomplishing the foregoing object that is extremely simple and economical to produce and which can be sold at retail at an economical figure.

A still further and specific object of this invention is the provision of a combined fork and tong culinary implement formed of two sections of wire as complements of one another to cooperate in performing the functions of a fork and/or a tong.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a plan view of a preferred construction of the culinary implement embodying the principles of the present invention.

Fig. 2 is a side elevational view of the implement as seen from the right-hand side of Fig. 1.

Fig. 3 is a view similar to Fig. 1 showing the parts in an open position as distinguished from the closed position in Fig. 1, Fig. 3 having a part of the implement body portion removed to conserve space on the drawing.

Fig. 4 is an end elevation of the implement as seen from the upper end of Fig. 1 and with the parts closed.

Fig. 5 is a view similar to Fig. 4 illustrating the parts in an open position.

Fig. 6 is an enlarged transverse sectional view through a joint which oscillatively connects the parts to one another and as seen from line 6—6 on Fig. 2.

Throughout the several views of the drawings similar reference characters are employed to denote the same or similar parts.

The culinary tool or implement of the present invention, as noted above, is made or formed of two lengths of wire each bent to be substantially the complement of the other and which wires or parts may, for convenience, be designated as the right-hand side or fingers part 10 and the left-hand side or thumb part 11. Since the left-hand side or thumb part 11 is more clearly illustrated in the plan and side elevational views in Figs. 1 and 2 said thumb part will be first described in detail.

Accordingly, the said thumb part 11 is made of a length of wire having a body portion 12 circular in cross-section and of any suitable or desirable length similar, for example, to the length of forks available on the market for "toasting marshmallows," "spearing and holding frankfurters in or near an outdoor fire," and the like. One end of the body portion 12 is turned on itself as at 13 to provide a loop 14 which has an opening 15 of sufficient diameter to receive the thumb of the user's right hand. The loop 14 may be designated as at the end of a handle portion 16 which is contiguous and integral with the body portion 12 and is formed to extend at a downward angle from its point 17 of joinder with the body portion 12 as clearly illustrated in Fig. 2.

The other end of the body portion 12 is bent to form in effect a jaw, indicated in its entirety by the reference character 18', said jaw, when viewed as extending longitudinally comprising a pair of downwardly projecting arms 18 and 21 having their lower ends joined by a base 20. The arms 18 and 21, as seen in Fig. 2, converge toward one another with the arm 18 converging from its point of joinder 19 with the body portion 12 to the adjacent end of the jaw base 20 while the arm 21 converges from its upper end 22 to the adjacent end of the jaw base 20. The upper end 22 of jaw arm 21 is in axial alignment with the wire body portion 12 and is joined to the inner end of an angularly, laterally, extending arm 23 which has integral with its outer end 24 the fork tine 25 that terminates in a point 26. The jaw arms 18 and 21 in addition to downwardly converging toward one another also extend laterally angularly of the implement, as illustrated in Fig. 6, for a major portion of their lengths whereupon each is provided with a similar bend 26' to cause the base 20 of the jaw to lie in a plane parallel with and below that passing through the wire body portion 12.

The right-hand side or fingers part 10 is likewise made of a length of wire somewhat greater than that of the thumb part 11, as will be obvious from the drawing, and is provided with a body portion 27 circular in cross-section having its upper end 28 turned on itself to provide a loop 29 with an aperture 30 therethrough. The loop 29 and its aperture 30 have considerable length and is substantially oval in plan, by comparison with loop 14 and its opening 15, and adapted to receive the fingers of the right hand when the thumb is in the loop aperture 15. The loop 29 may be said to constitute the handle portion 32 of the fingers part 10 and joins with the body portion 12 at the point 45. The handle portion 32 extends at a downward angle the same as the handle portion 16 of the thumb part 11. For convenience in handling the implement of the present invention the outer end of the handle portion 32 or loop 30 is upwardly arched as at 31 and provides a base or rest for the side of the hand. It will be readily understood that the handle portions 16 and 32 of the present implement are quite similar to the handle portions of a pair of scissors or shears and as will be subsequently made clear the said portions are similarly employed.

The body portion 27 of fingers part 10 has connected at its other end 33 a jaw, indicated in its entirety by the reference character 34', through the upper end of a jaw arm 34 which terminates in one end of the jaw base 35 having at its other end a second jaw arm 36 terminating at 37 in a portion of the wire axially aligned with the body portion 27. The jaw 34' of the fingers part 10 is similar in all respects to the jaw 18' of thumb part 11 and has its arms 34 and 36 together with the joining base 37 in alignment with the corresponding arms 18 and 21 and joining base 20. The fingers part 10 is provided from its point 37 with an outwardly, laterally disposed arm 38 which terminates in the fork tine 39 having its free end pointed as at 40. The jaw arms 34 and 36 similar to the jaw arms 18 and 21 in addition to downwardly extending are outwardly, angularly disposed and provided with a bend 41 similar to the bend 26' for thereby bringing the jaw base 35 to a point to underlie the fingers part body portion 27.

The fingers part 10 and thumb part 11 are adapted to be joined to one another in such manner that they may be respectively oscillated about the longitudinal axes of their body portions 12 and 27. For this purpose there is provided a plurality of joining collars 42, 43 and 44 respectively located at the ends 17 and 45 of the handle portions and at the ends of the jaws at points 19 and 33 and 22 and 37. These collars conveniently take the form of elongated strips of material with the collar 42 having an elongated opening therein sufficient to embrace the body portions 12 and 27 of the thumb and fingers parts 11 and 10 and the end 28 of the fingers part 10 while the collars 43 and 44 have their openings of less elongation and sufficient to merely embrace the body portions of the fingers and the thumb parts 10 and 11. As clearly seen in Fig. 6 the collar strips have their ends butted, as at 46, and said ends are then welded to one another and the collars then welded to the thumb part body portion 12 at the points indicated by reference numeral 47. By this construction the bearing collars are secured against inadvertent displacement.

With the parts of the implement held by the right-hand in the positions illustrated in Figs. 1, 2 and 4 and with the handle portions 16 and 32 in face contact as most clearly illustrated in Fig. 4, the implement may be used as a fork and any desired food product, a frankfurter for example, impaled on the tines 25 and 39 in the usual manner of using a fork. As a matter of fact, the implement when used as a fork may have the handle portions 16 and 32 and including the loops 14 and 29 grasped in the hand in the normal manner without inserting the thumb and fingers in the handle openings 15 and 30.

When desired to use the implement as a tong the thumb and fingers are inserted through their appropriate apertures or openings 15 and 30 whereupon an outward movement of the said thumb and fingers relative to one another will open the jaws to the positions shown in Figs. 3 and 5. The said jaws may then be lowered over the object, food product, or the like, a frankfurter, ear of corn, or the like, and the thumb and fingers moved toward one another for thereby closing the jaw arms 18 and 21 and 34 and 36 on the object and impinging the object in the pockets formed by the bends 26' and 41 in the jaw arms and dispose the jaws' bases 20 and 35 below the object's axial center, as clearly illustrated in phantom lines in Fig. 6 and wherein the object is identified by the reference numeral 48.

The downward angularity of the thumb and finger parts handle portions 16 and 32 enables the actuation or oscillation of the said parts 10 and 11 about the longitudinal axes of their body portions and at the same time enables the user to dispose his hand below the upper surface of the fireplace and thereby avoid inconvenience and burning which sometimes results from the use of a fork as heretofore employed in manipulating items of food on the grill bars of outdoor fireplaces, bar-b-cue pits, stove tops, and the like.

It will also be noted that by more or less extending the parts handle portions 16 and 32 the tines 25 and 39 may be brought closer to one another than is illustrated in Fig. 1 and toward the closer spacing as illustrated in Fig. 3.

From the foregoing, it is believed obvious that there has been provided a culinary tool or implement which is economical to produce and acquire and is useful and expedient for the purposes intended.

What is claimed is:

1. In a culinary implement of the class described to be manipulated by the hand of a user the combination of a fingers part and a thumb part each formed of a length of wire and each including a central portion constituting the body portion of its part, said body portions having normal positions lying adjacent one another with their axes extending parallel to one another in a horizontal plane, journals at the ends of said body portions retaining them in adjacent positions for independent oscillation, an offset tine at a similar end of each body portion with said tines oppositely offset with respect to one another and with said tines in the plane containing the body portions axes, and a handle portion at the other end of each body portion with said handle portions extending in the direction of extent of the axes of its body portion and angularly downwardly inclined with respect to the plane containing the axes of said body portions, said handle portion of the fingers part including a substantially elongated loop in the direction of the axis of its body portion adapted to encircle the user's fingers, and said handle portion of the thumb part including a substantially circular loop adapted to encircle the user's thumb.

2. In a culinary implement of the class described to be manipulated by the hand of a user the combination of a fingers part and a thumb part each formed of a length of wire and each including a central portion constituting the body portion of its part, said body portions having normal positions lying adjacent one another with their axes extending parallel to one another in a horizontal plane, journals at the ends of said body portions retaining them in adjacent positions for independent oscillation, an offset tine at a similar end of each body portion with said tines oppositely offset with respect to one another and with said tines in the plane containing the body portions axes, and a handle portion at the other end of each body portion with said handle portions extending in the direction of extent of the axes of its body portion and angularly downwardly inclined with respect to the plane containing the axes of said body portions, said handle portion of the fingers part including a substantially elongated loop in the direction of the axis of its body portion adapted to encircle the user's fingers, and said handle portion of the thumb part including a substantially circular loop adapted to encircle the user's thumb, and said fingers loop at its outer end upwardly bent to provide a rest for the side of the user's hand.

3. In a culinary implement of the class described to be manipulated by the hand of a user the combination of a fingers part and a thumb part each formed of a length of wire and each including a central portion constituting the body portion of its part, said body portions having normal positions lying adjacent one another with their axes extending parallel to one another in a horizontal plane when in normal use, journals at the ends of said body portions retaining them in adjacent positions for independent oscillation, an offset tine at a similar end of each body portion with said tines oppositely offset with respect to one another and with said tines in the plane containing the body portions axes, a handle portion at the other end of each body portion with said handle portions angularly downwardly inclined with respect to the plane containing the axes of said body portions so that actuation of said handle portions effects the oscillation of the fingers and thumb parts, and means formed in each fingers part and thumb part downwardly disposed with respect to the plane containing the axes of the parts body portions and between the tine and body portion of each part partaking of oscillations imparted to the said parts and co-operating with one another in maintaining the parts in their normal positions, comprising a downwardly projecting arm from its body portion, a downwardly projecting arm from the inner end of its tine, said arms of each fingers part and thumb part having the lower ends of its arms joined to one another and which arms joined ends are adapted to contact one another when the fingers part and thumb part are in their normal positions.

4. In a culinary implement of the class described to be manipulated by the hand of a user the combination of a fingers part and a thumb part each formed of a length of wire and each including a central portion constituting the body portion of its part, said body portions having normal positions lying adjacent one another with their axes extending parallel to one another in a horizontal plane when in normal use, journals at the ends of said body portions retaining them in adjacent positions for independent oscillation, an offset tine at a similar end of each body portion with said tines oppositely offset with respect to one another and with said tines in the plane containing the body portions axes, a handle portion at the other end of each body portion with said handle portions angularly downwardly inclined with respect to the plane containing the axes of said body portions so that actuation of said handle portions effects the oscillation of the fingers and thumb parts, and means formed in each fingers part and thumb part downwardly disposed with respect to the plane containing the axes of the parts body portions and between the tine and body portion of each part partaking of oscillations imparted to the said parts and co-operating with one another in maintaining the parts in their normal positions, comprising a U-shaped bend in each part and each bend including a downwardly projecting arm from its body portion, a downwardly projecting arm from the inner end of its tine, and a base joining the lower ends of said arms of each part which are adapted to contact one another when the fingers part and thumb part are in their normal positions.

5. In a culinary implement of the class described to be manipulated by the hand of a user the combination of a fingers part and a thumb part each formed of a length of wire and each including a central portion constituting the body portion of its part, said body portions having normal positions lying adjacent one another with their axes extending parallel to one another in a horizontal plane when in normal use, journals at the ends of said body portions retaining them in adjacent positions for independent oscillation, an offset tine at a similar end of each body portion with said tines oppositely offset with respect to one another and with said tines in the plane containing the body portions axes, a handle portion at the other end of each body portion with said handle portions angularly downwardly inclined with respect to the plane containing the axes of said body portions so that actuation of said handle portions effects the oscillation of the finger and thumb parts, and means formed in each fingers part and thumb part downwardly disposed with respect to the plane containing the axes of the parts body portions and between the tine and body portion of each part partaking of oscillations imparted to the said parts and co-operating with one another in maintaining the parts in their normal positions, comprising a U-shaped bend in each part and each bend including a downwardly projecting arm from its body portion, a downwardly projecting arm from the inner end of its tine, each of said arms having an outward bend intermediate its ends, and a base joining the lower ends of said arms of each part which contact one another when the fingers part and thumb part are in their normal positions.

6. In a culinary implement of the class described to be manipulated by the hand of a user the combination of a fingers part and a thumb part each formed of a length of wire and each including a central portion constituting the body portion of its part, said body portions having normal positions lying adjacent one another with their axes extending parallel to one another in a horizontal plane when in normal use, journals at the ends of said body portion retaining them in adjacent positions for independent oscillation, an offset tine at a similar end of each body portion with said tines oppositely offset with respect to one another and with said tines in the plane containing the body portions axes, a handle portion at the other end of each body portion with said handle portions angularly downwardly inclined with respect to the plane containing the axes of said body portions so that actuation of said handle portions effects the oscillation of the fingers and thumb parts, and means formed in each fingers part and thumb part downwardly disposed with respect to the plane containing the axes of the parts body portions and between the tine and body portion of each part partaking of oscillations imparted to the said parts and cooperating with one another in maintaining the parts in their normal positions, comprising a downwardly projecting arm from its body portion, a downwardly projecting arm from the inner end of its tine, each of said arms having an outward bend intermediate its ends, said arms of each fingers part and thumb part having the lower ends of its arms joined to one another and which arms joined ends are adapted to contact one another when the fingers part and thumb part are in their normal positions.

References Cited in the file of this patent

UNITED STATES PATENTS

| Number | Name | Date |
|---|---|---|
| 67,402 | Bosworth | Aug. 6, 1867 |
| 515,242 | Markham | Feb. 20, 1894 |
| 1,487,739 | Harris | Mar. 25, 1924 |
| 2,508,823 | Habeck | May 23, 1950 |